Raymond Keith Kibbe
INVENTOR.

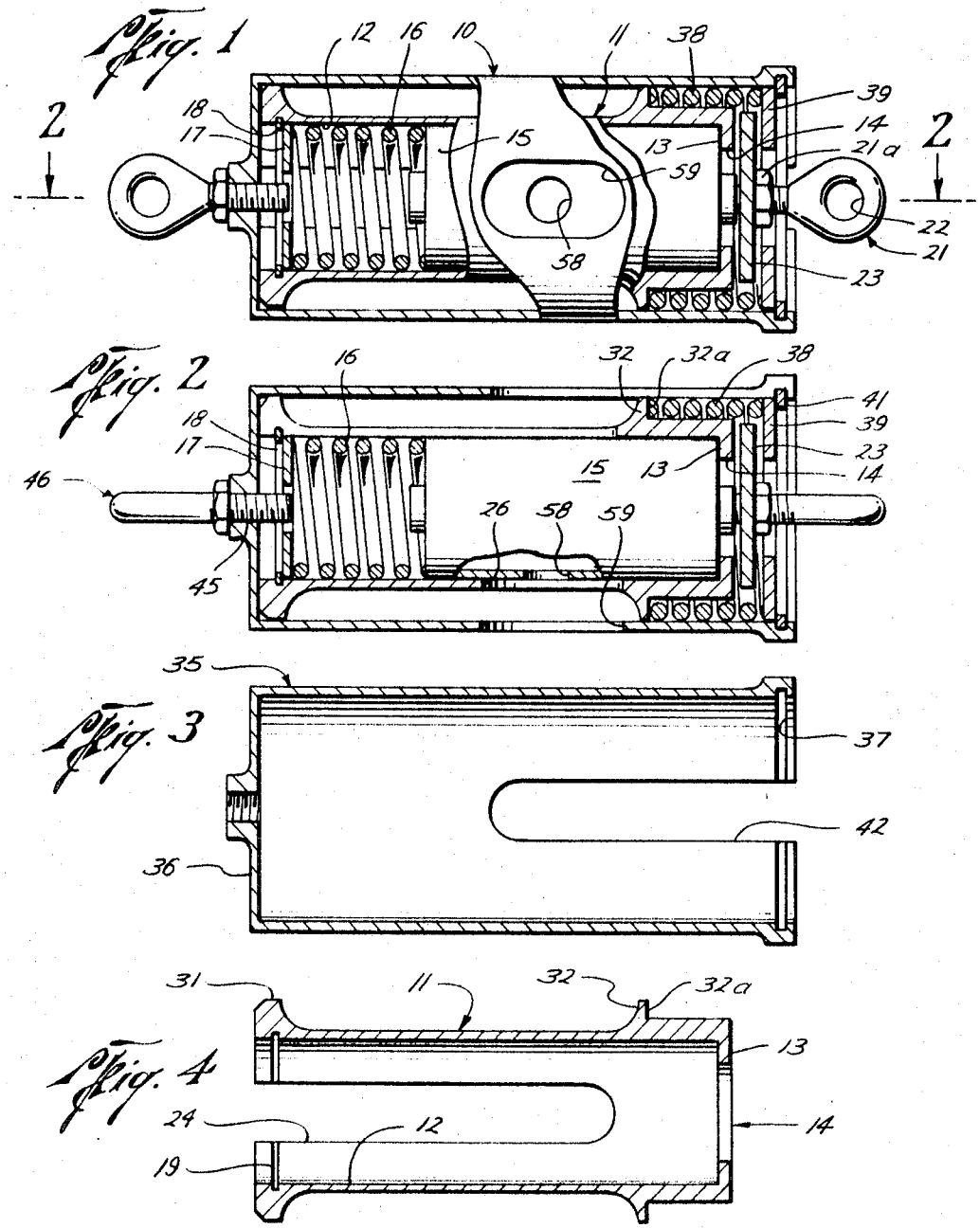

ATTORNEYS

3,464,049
LOAD CELL PROTECTION DEVICE

James E. Webb, Administrator of the National Aeronautics and Space Administration, with respect to an invention of Raymond Keith Kibbe, Solana Beach, Calif.

Filed Dec. 19, 1967, Ser. No. 691,739
Int. Cl. G01l 1/22

U.S. Cl. 338—5                                      6 Claims

ABSTRACT OF THE DISCLOSURE

A load cell protection device incorporating a spring-loaded, break-away mechanism for axially directed compression or tension forces. The load cell is slidably enclosed within an inner cylindrical housing and spring-biased to one end thereof. The inner housing is slidably enclosed within an outer housing and spring-biased therein in the opposite direction. The device includes a filter for adapting to operation in corrosive atmospheres.

---

The invention described herein was made in the performance of work under a NASA contract and is subject to the provisions of Section 305 of the National Aeronautics and Space Act of 1958, Public Law 85–568 (72 Stat. 435; U.S.C. 2457).

BACKGROUND OF THE INVENTION

The invention relates to a load cell protection device, and more particularly to a load cell overload protection device which is characterized by a spring-loaded break-away mechanism for axially directed compression or tension forces.

As is known in the art, a load cell is a force measuring mechanism usually in the form of a high strength metal column to which a plurality of strain gages are bonded. The gages are adapted to be electrically connected as in a bridge circuit whereby the imposition of a load on the metal column with distortion of the strain gages results in changes in their electrical resistance and an output voltage which varies proportionally with the load.

A conventional form of protection device for load cell transducers utilizes a mechanical stop which is threadedly attached at the top of the load cell transducer and is designed to intercept the load when the deflecting member of the load cell has been deflected to its safe limit of a few thousandths of an inch. A critical adjustment as to the permissible range of movement of the mechanical stop is required to prevent damage to the load cell transducer and yet avoid loss of measurement data.

The present invention which is designed to overcome the disadvantages of the prior devices utilizes a spring-loaded break-away mechanism which permits a non-critical range of movement for the mechanical stop. The load cell transducer is slidably enclosed in a cylindrical inner housing and is biased to one end thereof by a spiral spring. The inner housing is also enclosed in a concentric coaxial outer housing and is biased in the opposite direction to one end thereof by an outer spiral spring. When the preload of the inner spring is exceeded by a compressive force applied to the load cell transducer, the load cell moves down the bore of the inner housing until a mechanical stop affixed to the cell contacts one end of the inner housing and thereby transfers the load from the load cell to the inner and outer housings. In like manner, when the load cell is subjected to a tensile force which exceeds the preload of the outer spring, the inner housing and load cell transducer therein move along the bore of the outer housing until the mechanical stop contacts a restraining member of the outer housing and thereby transfers any increase in the tension force from the load cell to the outer housing. The large gap which is possible in the breakaway mechanism as represented by the span of travel of the mechanical stop eliminates the need for delicate adjustments to the stop disc gap. The device includes a filter attachment whereby corrosive atmospheres may be drawn into the transducer housing without harmful effect.

BRIEF DESCRIPTION OF THE DRAWINGS

The invention will be better understood by referring to the drawings in which like numerals identify like parts in the different figures thereof, and in which:

FIG. 1 is a view of the overload protection device of this invention partly in longitudinal section with parts thereof broken away for clarity;

FIG. 2 is a longitudinal sectional view looking in the direction of the arrows as shown in FIG. 1;

FIG. 3 is a longitudinal sectional view of the outer housing member of the invention;

FIG. 4 is a longitudinal sectional view of the inner housing member in which the load cell transducer is slidably mounted.

Figure 5:
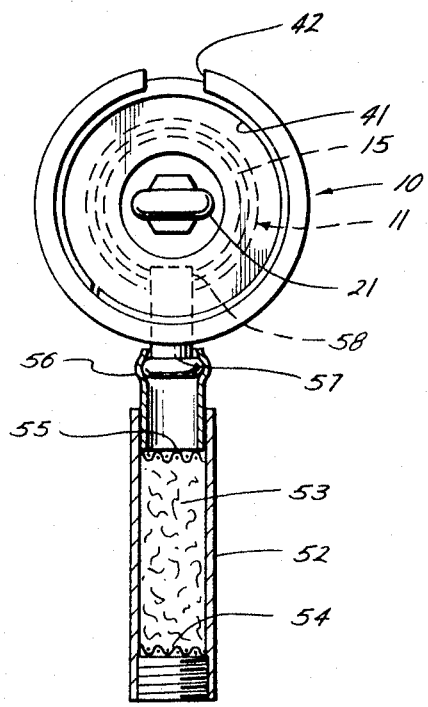
FIG. 5 is an end view of the load protection device of this invention showing the attachment of a filter for adapting the device for operation in a corrosive atmosphere.

Referring more particularly to the drawings, the overload protection device 10 comprises a generally cylindrical inner housing 11 having a coaxial circular bore 12 extending therethrough. At one end the housing 11 is provided with a transverse end member 13 with a central opening 14 provided therein. The load cell transducer 15 is slidably disposed within the bore of the housing 11 and is biased to the right side thereof, as shown in FIG. 1, by means of a spiral spring 16 which abuts one end of the transducer and also a transverse circular retainer member 17 which is located adjacent the other end of the housing 11. The retainer 17 abuts a retaining ring 18 which is seated within an annular groove 19 which is formed in the inner wall of the housing near the end thereof.

The load cell transducer 15 is preferably a conventional type in which the load sensitive element is enclosed within a cylindrical housing which is closed at one end by a diaphragm. The transducer is equipped with an end fitting 21, the threaded shank 21a of which is attached to one end of the load sensitive element and extends through the opening 14 in the end of the inner housing 11. The member 21 includes a rod-end bearing 22 to the eye of which a load may be readily attached. A mechanical stop in the form of a circular disc 23 is also threaded onto the shank 21a in spaced relation to the transverse end member 13 of the inner housing 11.

As best shown in FIG. 4, the inner housing 11 is also provided with a longitudinally extending slot 24 which extends from the left end thereof throughout the greater part of its length and provides an opening through which the electrical leads from the load cell transducer may extend. A smaller opening 26 is also provided in the wall of the inner housing diametrically opposite the slot 24 as seen in FIG. 2, and provides a means for communicating the interior of the load cell transducer with a filter device to be hereinafter described.

The inner housing 11 is also equipped with an external annular flange 31 at one end and a second external annular flange 32 located near the end of the housing which includes the end member 13. The flanges 31 and 32 are of uniform outer diameter and support the inner housing 11 in coaxial relationship within an outer housing 35.

As shown in FIG. 3, the outer housing 35 is closed at one end with a transverse end member 36, and is provided with an annular groove 37 in the inner wall thereof adjacent its other open end. The inner housing 11 is slidably disposed within the bore of the outer housing and is biased to the left side thereof, as shown in FIGS. 1 and 2, by means of a spiral spring 38 which abuts the shoulder 32a of the flange 32, and also a circular retainer member 39 which is located adjacent the open end of the housing 35. The retainer 39 abuts a retaining ring 41 which is seated within the annular groove 37 in the inner wall of the housing.

In the condition of the protection device 10 in which no load is applied to the load sensitive element of the transducer, the stop disk 23 is located on the shaft 21, where it is substantially intermediate the restraining end 13 of the inner housing and the restraining member 39 in the corresponding end of the outer housing.

As best seen in FIG. 3, the outer housing 35 is also provided with a longitudinally extending slot 42 which extends from the right end thereof through the greater part of its length and provides an opening through which the electrical leads from the load cell transducer may extend. The end member 36 is provided with a coaxial threaded opening for receiving the threaded shank 45 of an end fitting 46 which includes a rod-end bearing, the eye of which provides means by which the device may be secured.

It will therefore be apparent that when the preload of the inner spring 16 is exceeded by a compressive force applied to the load cell transducer and acting to the left, as shown in the drawings, the load cell moves down the bore of the inner housing until the stop 23 contacts the restraining end 13 of the inner housing. Any increase in applied force cannot damage the load cell transducer since the additional force flows through the stop disk, the inner cylinder, and the outer cylinder to the end fitting 46.

It will also be apparent that the operation of the protection device 10 for applied tensile forces is identical in principle to its operation of applied compression forces. For example, when a tension force is applied which exceeds the preload of the outer spring 38, the inner housing and the load cell transducer therein move along the bore of the outer housing until the mechanical stop disk 23 contacts the retainer 39 at the right end of the outer housing and thereby any increase in the tension force flows through the outer housing to the end fitting.

It will therefore be apparent that a particular advantage of the device 10 is that the end-to-end deflection for the entire assembly is no greater than that of the load cell separately, up to the breakaway point. Furthermore, a large gap, as represented by the span of travel by the mechanical stop, is permissible in the operation of the break-away mechanism, and therefore eliminates any need for delicate adjustments to the location of the mechanical stop.

There is also shown in FIG. 5 a filter attachment 51 for adapting the device for operation in a corrosive atmosphere. The filter attachment includes a cylindrical housing 52 which is open at both ends and filled with an anhydrous material 53 which is retained within the housing by screens 54 and 55 at each end. The filter is attachable in fluid communication with the load cell transducer housing by a connecting sleeve 56 and nipple 57. The sleeve 56 is affixed at one end to the inner wall of the filter housing and at its other end to the nipple 57 which is affixed to the transducer housing. The nipple 57 communicates with the interior of the transducer housing through an opening 58 in the transducer wall and extends through the opening 26 in the inner housing and an aligned opening 59 in the outer housing. The transducer is thus allowed to "breathe" so that a zero pressure differential is maintained between the inside cavity of the transducer and its surrounding ambient pressure. This feature allows the electrical output of the transducer to be pressure insensitive which is a necessary feature if the device is to be used in simulated altitude test chambers. The filter arrangement also adapts the device for operation in a corrosive atmosphere, whereby the removal of moisture and contaminants prevents damage to the interior of the transducer.

It is also to be noted that the longitudinal slot 24 in the inner housing allows clearance around the lead wire cable in order that the transducer may be inserted into the inner housing during assembly. The slot 42 in the outer housing serves the same purpose as the assembled inner housing is inserted into the outer housing. During operation, the slots also provide sufficient clearance around the lead wire to allow for the "break-away" motion of the components prior to engagement of the stop 23 against the overload shoulders. Similarly the slots 26 and 59 in the two housings, respectively, are slightly elongated to allow clearance around the nipple for this motion.

It is to be understood, of course, that the foregoing disclosure relates only to a preferred embodiment of the invention and that it is intended to cover all changes and modification of the invention herein chosen for the purposes of the disclosure which do not constitute departure from the spirit and scope of the invention.

What is claimed and desired to be secured by Letters Patent is:

1. An overload protection device for a load cell transducer, including a load sensitive element, said device comprising an inner container having a cylindrical bore therein;
    a load cell transducer slidably disposed in said bore of said inner container and adapted for movement in the axial direction of said bore;
    a first spring means resiliently biasing said transducer to one end of said inner container;
    an outer generally cylindrical container in sleeved relationship to said inner container, said inner container being slidably disposed for movement in the axial direction of said outer container;
    second spring means resiliently biasing said inner container to one end of said outer container in a direction opposed to the direction of biasing force of said first spring means;
    a shaft connected to the load sensitive element of said load cell transducer and extending through one end of said inner container and the corresponding end of said outer container whereby a load may be transmitted through said shaft to the load sensitive element;
    a stop member affixed to said shaft;
    a first restraining member affixed to said inner container in normally spaced relation to said stop member whereby a compressive force of greater magnitude than the preload of sensitive element in a direction opposed to the biasing force of said first spring means moves the load cell transducer until the stop member engages said first restraining member and thereby transfers the compressive force in excess of the preload of said first spring means to said containers; and
    a second restraining member affixed to said outer housing in normally spaced relation to said stop member whereby any tension force of a magnitude greater than the preload of said second spring means applied to the load sensitive element in a direction opposed to the biasing force of said second spring means moves said inner housing until said stop member engages said second restraining member and thereby transfers the tensile force in excess of the preload of said second spring means from the load sensitive element to said outer container.

2. A protection device of the character described in claim 1 wherein said stop member is adjustably positionable on said shaft to permit selective variation in the spacing between said stop member and said first and second restraining members.

3. A protection device for a load cell transducer including a load sensitive element enclosed within a transducer housing, said device comprising inner cylindrical container;
- a load cell transducer slidably disposed in said inner container;
- a first spring means resiliently biasing said transducer to one end of said inner container;
- an outer cylindrical container, said inner container being slidably disposed in said outer container;
- shoulder means on said outer container;
- second spring means engaging said shoulder means and resiliently biasing said inner container to one end of said outer container in a direction opposed to the direction of bias force of said first spring means;
- a shaft member connected to the load sensitive element of said load cell transducer and extending through one end of said load cell transducer and extending through one end of said inner container and the corresponding end of said outer container whereby a load may be transmitted through said shaft member to the load sensitive element;
- an end fitting member secured to the end of said outer container remote from said shaft whereby said outer container may be secured to a support means;
- a stop member affixed to said shaft;
- a first restraining member affixed to said inner cylindrical container in normally spaced relation to said stop member whereby a compressive force of greater magnitude than the preload of said first spring means applied to said load sensitive element in a direction opposed to the biasing force of said first spring means moves said transducer until the stop member engages said first restraining member and thereby transfers the compressive force in excess of the preload of said first spring means to said containers;
- a second restraining member affixed to said outer housing in normally spaced relation to said stop member whereby any tension force of a magnitude greater than the preload of said second spring means applied to the load sensitive element in a direction opposite the biasing force of said second spring means moves said inner housing until said stop member engages said second restraining member and thereby transfers the tensile force in excess of the preload of said second spring means from the load sensitive element to said outer container and said end fitting member.

4. A protection device of the character described in claim 3 wherein said shaft member and said end fitting member are provided with rod-end bearings external of said outer container.

5. A protection device of the character described in claim 3 further including a filter means attached in fluid communication with the load cell transducer housing whereby said transducer housing communicates with the ambient atmosphere through said filter means while maintaining a zero pressure differential between the pressure inside and cavity of said transducer housing and the ambient pressure.

6. A protection device of the character described in claim 5 wherein said filter means comprises anhydrous material for adapting the device to operation in a corrosive atmosphere.

References Cited
UNITED STATES PATENTS

| 2,688,884 | 9/1954 | Warmoes et al. |
| 3,199,057 | 8/1965 | Gindes et al. |
| 3,297,971 | 1/1967 | Gindes et al. |

FOREIGN PATENTS

| 695,755 | 8/1953 | Great Britain. |

REUBEN EPSTEIN, Primary Examiner

U.S. Cl. X.R.

338—2